(12) United States Patent
Astle et al.

(10) Patent No.: US 10,800,677 B2
(45) Date of Patent: Oct. 13, 2020

(54) ELECTROLYTIC ZINC DOSING DEVICE AND METHOD FOR REDUCING SCALE

(71) Applicant: Ecowater Systems LLC, Woodbury, MN (US)

(72) Inventors: Robert Astle, Middlefield, CT (US); George Dimotsis, Woodbury, MN (US)

(73) Assignee: ECOWATER SYSTEMS LLC, Woodbury, MN (US)

( * ) Notice: Subject to any disclaimer, the term of this patent is extended or adjusted under 35 U.S.C. 154(b) by 24 days.

(21) Appl. No.: 15/902,004

(22) Filed: Feb. 22, 2018

(65) Prior Publication Data

US 2018/0237318 A1    Aug. 23, 2018

Related U.S. Application Data

(60) Provisional application No. 62/461,958, filed on Feb. 22, 2017.

(51) Int. Cl.
*C02F 1/46* (2006.01)
*C02F 1/461* (2006.01)

(52) U.S. Cl.
CPC ........ *C02F 1/46109* (2013.01); *C02F 1/4602* (2013.01); *C02F 2001/46119* (2013.01); *C02F 2001/46128* (2013.01); *C02F 2001/46133* (2013.01); *C02F 2001/46152* (2013.01); *C02F 2001/46171* (2013.01); *C02F 2201/006* (2013.01); *C02F 2201/4613* (2013.01); *C02F 2201/4617* (2013.01);
(Continued)

(58) Field of Classification Search
CPC ................ C02F 1/46109; C02F 1/4602; C02F 2001/46152; C02F 2201/4618; C02F 2201/4617; C02F 2201/46145; C02F 2201/4613; C02F 2201/006; C02F 2303/22; C02F 2001/46133; C02F 2001/46128; C02F 2001/46119; C02F 2303/08; C02F 2001/46171
See application file for complete search history.

(56) References Cited

U.S. PATENT DOCUMENTS

| | | |
|---|---|---|
| 3,984,303 A | 10/1976 | Peters et al. |
| 4,401,543 A | 8/1983 | Ishizuka |
| 4,529,572 A | 7/1985 | Romberger |

(Continued)

FOREIGN PATENT DOCUMENTS

| | | |
|---|---|---|
| EP | 1034140 B1 | 6/2002 |
| EP | 2985264 A1 | 2/2016 |

OTHER PUBLICATIONS

Vasudevan et al., Electrochemically assisted coagulation for the removal of boron from water using zinc anode, (2013), Desalination 310 pp. 122-129.*

*Primary Examiner* — Arun S Phasge
(74) *Attorney, Agent, or Firm* — Delio Peterson & Curcio LLC; Robert Curcio

(57) ABSTRACT

An electrolytic zinc dosing device that regulates the amount of zinc delivered or dosed into a flowing stream of water as a function, in part, of the current applied to an electrolytic cell and the flow rate of the flowing water. A replaceable electrolytic cell having an anode and a cathode connected to a power supply, and at least one bipolar electrode in aqueous solution between the anode and cathode. Flow rate information and/or total current information are used to determine the dosing quantity of zinc delivered.

16 Claims, 7 Drawing Sheets

(52) U.S. Cl.
CPC ............. *C02F 2201/4618* (2013.01); *C02F 2201/46145* (2013.01); *C02F 2303/08* (2013.01); *C02F 2303/22* (2013.01)

(56) References Cited

U.S. PATENT DOCUMENTS

| | | |
|---|---|---|
| 4,680,114 A | 7/1987 | Hayes |
| 4,781,805 A | 11/1988 | Dahlgreen |
| 4,789,448 A | 12/1988 | Woodhouse |
| 4,992,156 A | 2/1991 | Silveri |
| 5,279,748 A | 1/1994 | Hackett |
| 5,695,644 A | 12/1997 | Buchanan |
| 5,837,134 A | 11/1998 | Heskett |
| 6,136,177 A | 10/2000 | Hung |
| 6,258,250 B1 | 7/2001 | Weissenbacher et al. |
| 6,287,450 B1 | 9/2001 | Hradil |
| 7,497,953 B2 | 3/2009 | Dart |
| 7,638,031 B2 | 12/2009 | Elgressy |
| 2005/0127042 A1 | 6/2005 | Hastilow |

\* cited by examiner $$H_2O + 4e^- \rightarrow 4OH^- + 2H_{2(g)}$$

ELECTROLYTIC ZINC DOSING DEVICE AND METHOD FOR REDUCING SCALE

BACKGROUND OF THE INVENTION

1. Field of the Invention

The present invention concerns a device for controlling the precipitation of undesirable and harmful precipitates from aqueous systems, and a method for achieving the same. Specifically, the invention relates to an electrolytic zinc dosing device that regulates the amount of zinc delivered or dosed into a flowing stream of water as a function, in part, of the current applied to an electrolytic cell and the flow rate of the flowing water.

2. Description of Related Art

Water-soluble chromates, organic, and inorganic phosphates either alone or in combination with each other have found widespread use in the water treatment field. The use of these compounds or compositions containing the compounds save millions of dollars yearly due to their capacities to reduce scale formation and inhibit corrosion of metallic structures which convey or make use of water. It is known that in domestic water systems and in many aqueous industrial processes, sparingly soluble salts, and particularly salts having inverted solubility, such as calcium carbonate ($CaCO_3$), are readily precipitated on contact-surfaces of piping and equipment, especially in equipment that heat water. When the concentrations of calcium ion and carbonate ion exceed the solubility of the calcium carbonate reaction product, a solid phase of calcium carbonate (scale) forms. The scale prevents effective heat transfer, interferes with fluid flow, facilitates corrosive processes, and harbors bacteria. This scale is an expensive problem in many water systems, causing delays and shutdowns for cleaning and removal.

Scale-forming compounds can be prevented from precipitating by inactivating their cations with chelating or sequestering agents, so that the solubility of their reaction products is not exceeded. Generally, this requires many times as much chelating or sequestering agent as cation, and these amounts are not always desirable or economical.

Calcium carbonate crystals can be found in different forms and the most common are calcite, aragonite, and vaterite. Mineral or organic impurities can have a major influence on the crystal growth in terms of both the rate and the form. Calcite is a thermodynamically stable crystal form under normal conditions, but aragonite may be stable when certain impurities are present, including $Mg^{2+}$, $Ni^{2+}$, $Co^{2+}$, $Fe^{3+}$, $Zn^{2+}$, and $Cu^{2+}$. The presence of these impurities can result in a prolonged induction period leading to slower precipitation. A number of metallic cations, such as iron, copper, and zinc have been shown to affect $CaCO_3$ precipitation and scale formation. Metal ions can delay nucleation of $CaCO_3$ and promote the formation of aragonite crystals, retard crystal growth, and encourage bulk precipitation.

Zinc has been effectively shown to interfere with precipitation of calcium carbonate, causing there to be less build-up of scale in water hardware and appliances. The reduction in scale build-up keeps equipment operational for longer periods of time (for example, enhancing the longevity of coffee machines, dishwashers, and the like). The reduction also allows appliances to operate at their optimum power efficiency.

A problem in the art has been the precise application of zinc, that is, the method of introducing zinc to the water, which, if it is to be appropriately applied, must take into account the influent hardness levels and the flow rate of the influent water.

Current dissolution methods have poor control with respect to temperature, flow, and use. This generally results in too much zinc in long stagnation, and not enough zinc during high flow periods. Furthermore, current mechanical metering methods known in the art for such application are expensive and complex.

SUMMARY OF THE INVENTION

Bearing in mind the problems and deficiencies of the prior art, it is therefore an object of the present invention to provide a device that allows for the precise dosing of zinc at an optimum concentration as a function of influent hardness levels and/or flow rate.

It is another object of the present invention to provide a low current and low scaling device that allows for precise dosing.

It is yet another object of the present invention to provide a means to detect and confirm that an electrolytic cell is appropriately designed for polarity reversal.

Still other objects and advantages of the invention will in part be obvious and will in part be apparent from the specification.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-10 of the drawings in which like numerals refer to like features of the invention.

Electrolysis is a technique that uses a direct electric current (DC) to drive an otherwise non-spontaneous chemical reaction. The use of an electrolytic cell allows for the dosing or decomposition of chemical compounds into solution. In the present case, an electrolytic cell is used as a means for dosing the solution with a zinc compound in order to reduce the build-up of scale.

Figure 1:
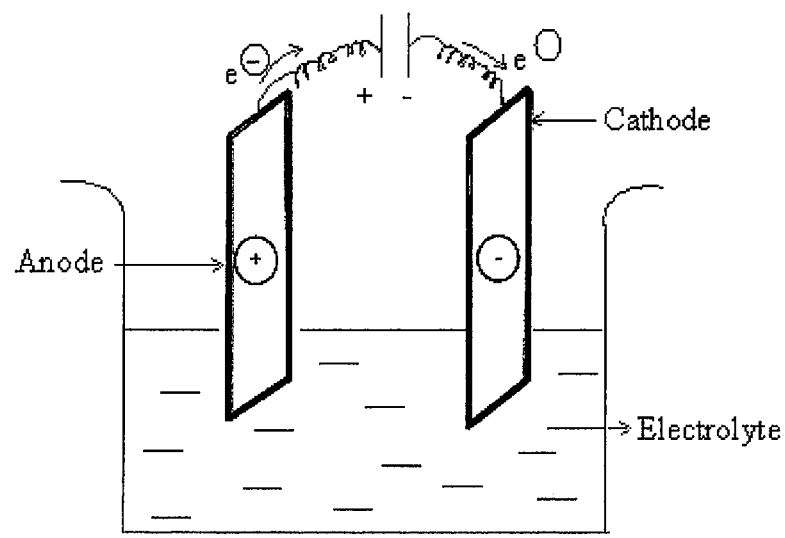
FIG. 1 depicts an electrolytic cell having two zinc electrodes in solution.

FIG. 1 depicts an electrolytic cell 10 having two zinc electrodes 12, 14 in solution 16. A voltage source 18 drives the reaction shown between the positive zinc electrode 12 and the negative zinc electrode 14. At the anode (12) the majority of the applied current produces $Zn^{+2}$. The reaction at the anode may be represented as:

$$Zn = Zn^{+2} + 2e^-$$

$$2Cl^- = Cl_{2(g)} + 2e^-$$

In this reaction, zinc atoms in the electrode shed the two electrons in their outer shell and dissolve into the solution as zinc ($Zn^{2+}$) ions, leaving the electrons behind in the electrode.

These electrons are moved via the power supply in the form of current to the cathode, where for each electronic a hydroxide ion is produced. The reaction at the cathode may be represented as follows:

$$4H_2O + 4e^- = 4OH^- + 2H_{2(g)}$$

Reversing the polarity will drive identical reactions on the opposite electrodes. In this manner, the applied current may be a direct indicator or measure of the rate of zinc dosing. In a preferred embodiment, the present invention takes into account the reversal of polarity, in part, as a way to maximize the life of the electrodes. Furthermore, in this manner, there is less concern regarding electrode orientation.

Zinc has been shown to interfere with the precipitation of calcium carbonate, which causes the desirable effect of reducing scale build-up in water hardware and appliances, and especially in devices that heat water. Reducing scale generally keeps the equipment operational for longer periods of time, and keeps appliances operating at their best power efficiency.

It is found that for best performance of scale reduction, equipment longevity, and the like, zinc should be in the range of about 0.15 to 3.5 ppm. It is desirable that this level be proportional to the hardness and below the taste threshold for human consumption.

Although other methods exist in the art for introducing (dosing) zinc into water, the present invention provides a low cost means for dosing zinc, which is capable of accurately imparting parts-per-million levels. Moreover, the present invention provides a device and method for dosing zinc at optimal concentration based on influent hardness levels, and which takes into account the flow rate. The concept of dosing zinc in a manner that is proportional to the flow rate and influent hardness is unique to the present invention. This method is effective because the electrolytic cell resistance is a predictable quantity.

Figure 2A:
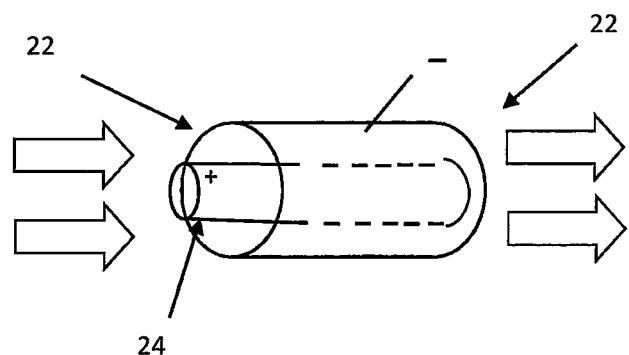
FIG. 2A depicts a first embodiment of a concentric electrolytic cell of the present invention.

FIG. 2A depicts a first embodiment of a concentric electrode 20. Concentric electrodes are utilized to form a replaceable cell. The primary reactions may be represented as:

$$H_2O + 4e^- \rightarrow 4OH^- + 2H_{2(g)} \text{ (cathode)}$$

$$Zn \rightarrow Zn^{+2} + 2e^- \text{ (anode)}$$

Figure 2B:
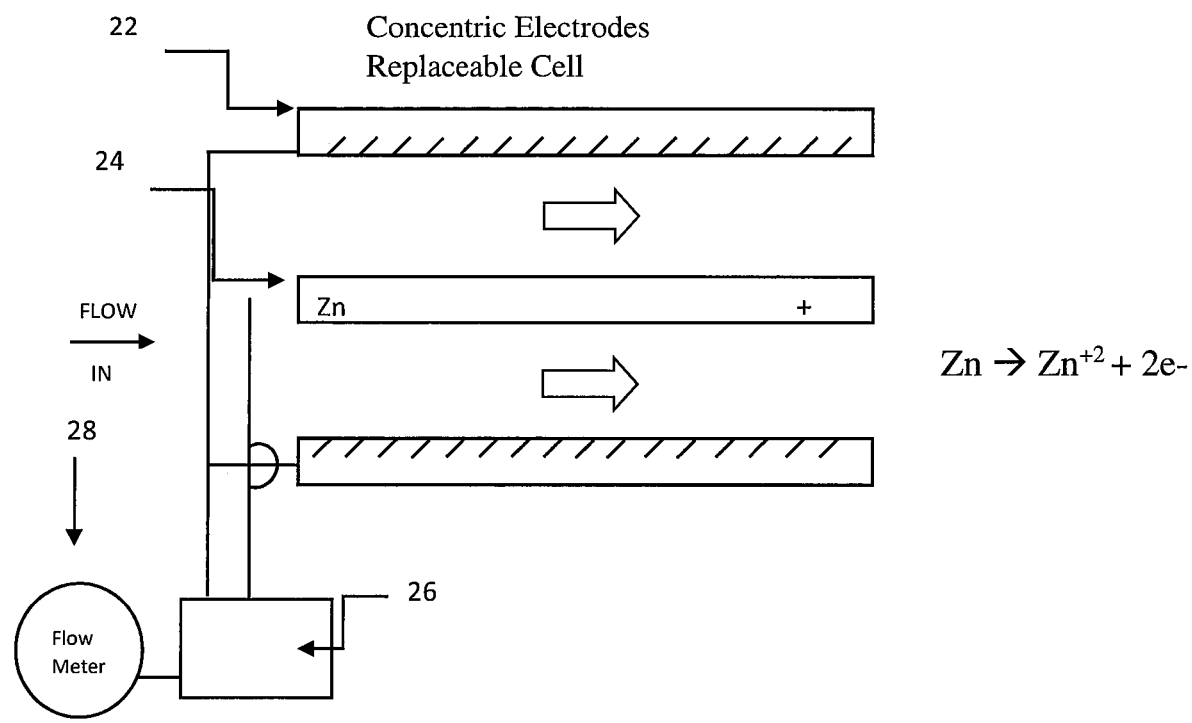
FIG. 2B is a cross-sectional view of the electrolytic cell of FIG. 2A.

A cross-sectional view of electrode 20 is depicted in FIG. 2B. In this embodiment, the outer shell 22 of electrode 20 is a cathode, which may be comprised of graphite, copper, brass, or stainless steel. In inner shell (rod) 24 is the anode, and is comprised of zinc or a zinc compound.

Solution flows into the concentric electrolytic cell in the axial direction as depicted by the flow arrows. Solution leaves the cell in the axial direction having transformed the zinc from the anode as represented by:

$$Zn \rightarrow Zn^{+2} + 2e^-$$

A controller 26 governs the electrolysis process, and imparts a potential difference across the outer shell 22 and the inner shell or rod 24. Flow meter 28 determines the flow rate of the solution passing through the electrolytic cell and provides the flow rate information to controller 26.

Using controller 26, the process (applying voltage across the cathode and anode; applying current through solution) is regulated, and a specific dosing of the zinc is possible as a function of flow rate.

Figure 3:
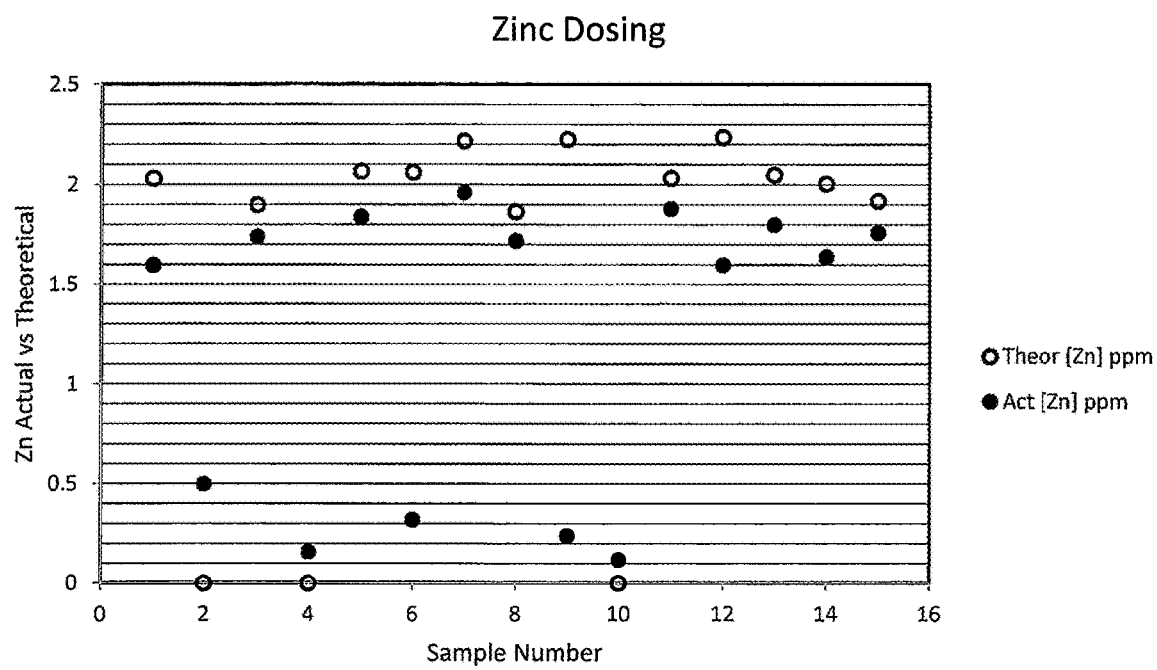
FIG. 3 depicts a plot of actual versus theoretical zinc dosing in parts per million for a number of samples.

FIG. 3 depicts a graph of actual versus theoretical zinc dosing in parts per million for a number of samples. As indicated, the dosing levels are well controlled and match quite closely the theoretical expectation.

Figure 4:
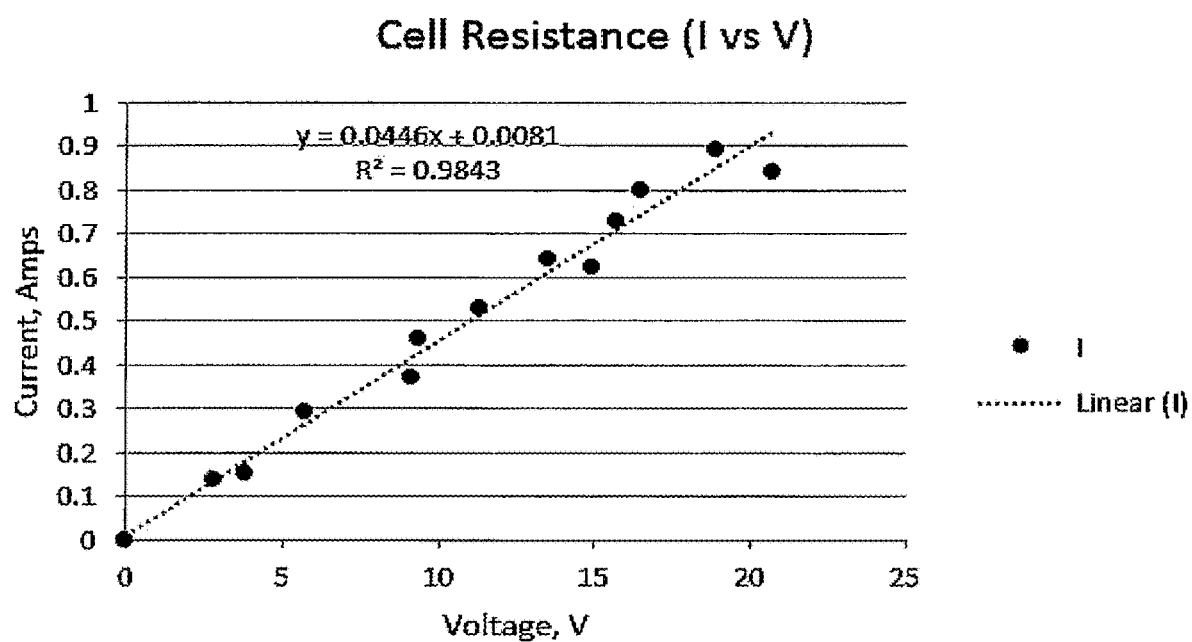
FIG. 4 depicts a linear extrapolation of a plot of the electrolytic cell resistance (I v. V)

FIG. 4 depicts a linear extrapolation of a plot of the electrolytic cell resistance (I v. V). The resistance is predictably linear and closely follows the data.

Operating constraints serve to govern some design considerations. For example, safety concerns, such as the application of a lower voltage power source (<24 VDC), necessitate design alterations. The need for a lower cost power supply that can satisfy regulatory requirements for safety presents its own issues, which are ultimately addressed by the present invention.

The desired system is modeled mathematically to represent accurately the dosing control exhibited by the design. The voltage (V) applied to the electrolytic cell is proportional to the current (I) transmitted therethrough by the cell resistance R:

$$V = I(\text{rate of dosing}) * R_{cell}$$

where $R_{cell} = \rho L/A$
$\rho$ = resistivity
L = length
A = cross-sectional area
and $\rho = 1/K$
where K is the conductivity of solution.

In order to achieve some of the product design conditions, Zn—Zn electrodes are introduced. It has been determined that for Zn—Zn electrodes, the lowest electrical resistance can be realized with a parallel plate design. In this regard, a cylinder and rod design does not produce the lowest electrical resistance. The parallel plate design accounts for a more non-uniform current density and exhibits a greater potential to scale the rod or center conductor. Whereas, a single plate design or a multiple plate design allows for a very small footprint under operation.

Figure 5A:
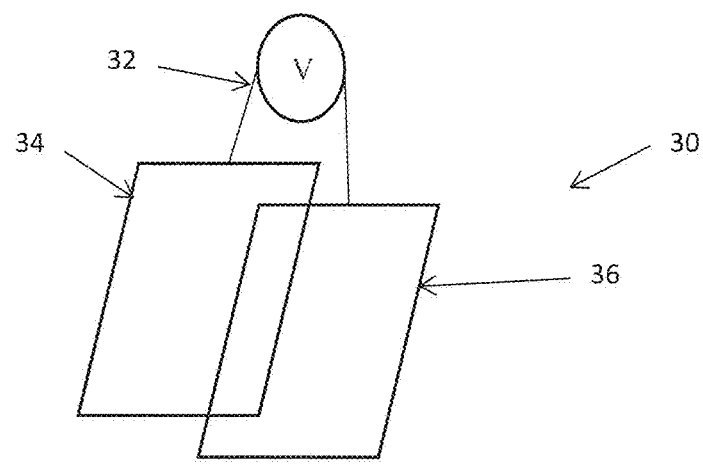
FIG. 5A depicts a single parallel plate electrolytic cell design, where the voltage source is applied across both plates.
Figure 5B:
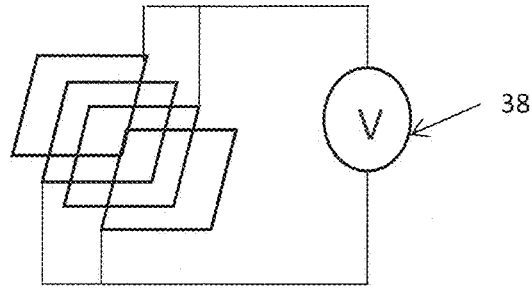
FIG. 5B depicts a multiple parallel plate design where the voltage source is applied across a plurality of plates.

FIG. 5A depicts a single plate electrolytic cell design 30, where voltage source 32 is applied across both plates 34, 36. FIG. 5B depicts a multiple plate design where the voltage 38 source is applied across a plurality of plates. In this manner, the design comprises one or more cell pairs, where each cell pair includes a zinc anode and a zinc cathode. In a similar manner as discussed above, a controller regulates the dosing current to provide zinc electrolysis that allows a user to provide a dosage on the order of parts per million, and dose as a function of flow rate.

In another embodiment, a bipolar cell is utilized to achieve a lower cost, more efficient design, for a multiple plate cell. In a bipolar electrolytic cell, a bipolar electrode is employed without metallic connection with the current supply, such that one face of which acts as anode surface and the opposite face as a cathode surface when an electric current is passed through the cell. That is, a bipolar electrode is an electrically conductive material that promotes electrochemical reactions at its extremities (poles) even in the absence of a direct ohmic current. When sufficient voltage is applied to an electrolyte solution in which a bipolar electrode is immersed, the potential difference between the bipolar electrode and the solution drives oxidation and reduction reactions. The bipolar design includes an anode, cathode, and one or more bipolar electrodes.

Essentially, in a bipolar electrode design, because no direct electrical connection is required to activate reduction (redox) reactions, large arrays of electrodes can be controlled with a single DC power supply or a battery.

Figure 6:
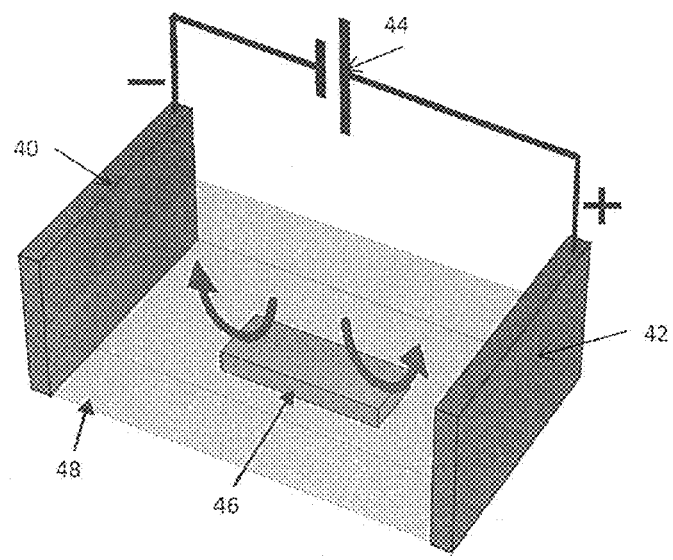
FIG. 6 depicts a bipolar electrode electrolytic cell where the driving electrodes are opposite one another, and a single DC power source is applied to each.

FIG. 6 depicts a bipolar electrode electrolytic cell. The driving electrodes 40, 42 are opposite one another, and a single DC power source 44 is applied to each. A bipolar electrode 46 is placed in solution 48 between the two driving electrodes.

In a bipolar electrode electrolytic cell design, the poles of a bipolar electrode are oriented in the opposite polarity of the driving electrodes. Polarization occurs when a potential difference is applied across the driving electrodes. This polarization generates a potential difference between the two extremities of the bipolar substrate that is equal to the electric field value multiplied by the size of the object. If this potential difference is important enough, then redox reactions can be generated at the extremities of the object, oxidations will occur at one extremity coupled simultaneously to reductions at the other extremity.

The driving electrodes produce the electric field into which the bipolar electrode is immersed. The nature of the electric field formed between the driving electrodes depends on the geometry and the conductivity of the electrolyte solution. In a bipolar cell, the bipolar electrode is zinc or a zinc compound.

In a cell designed for constant polarity, the anode is zinc (or a zinc compound), the bipolar electrodes are zinc (or a zinc compound), and the cathode can be another metal (for example, copper, SS, or graphite).

In a cell designed for polarity reversal, the anode, cathode, and bipolar cells are zinc (or a zinc compound).

The driving current of a bipolar electrolytic cell may be much lower than that required for an electrolytic cell without a bipolar electrode immersed. Typically, the "bipolar" Current ($I_{bipolar}$) is a fraction of the amount for a theoretically non-bipolar electrolytic cell design, $I_{theoretical}$:

$$I_{bipolar} = I_{theoretical}/n$$

where, n is the number of cell pairs.

The cell configuration may be optimized through the implementation of a bipolar electrode electrolytic cell for the lowest power.

Figure 7:
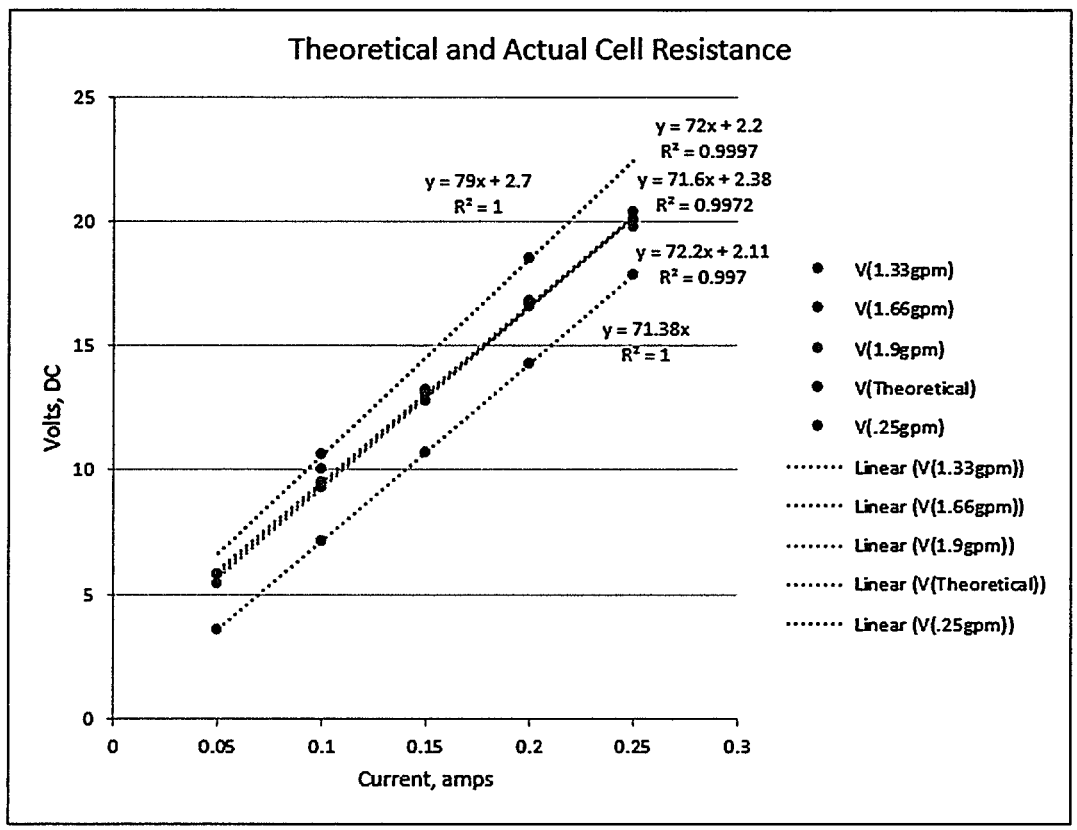
FIG. 7 is a graph of a comparison of the theoretical cell resistance to the actual cell resistance in a four electrode pair cell as a function of flow rate.

A proof of concept was demonstrated for a four pair bipolar electrolytic cell. The results accurately followed the theoretical predictions. FIG. 7 is a graph of a comparison of the theoretical cell resistance to the actual cell resistance in a four electrode pair cell as a function of flow rate. The linearity of the actual cell is closely correlated to the theoretical predictions.

Figure 8:
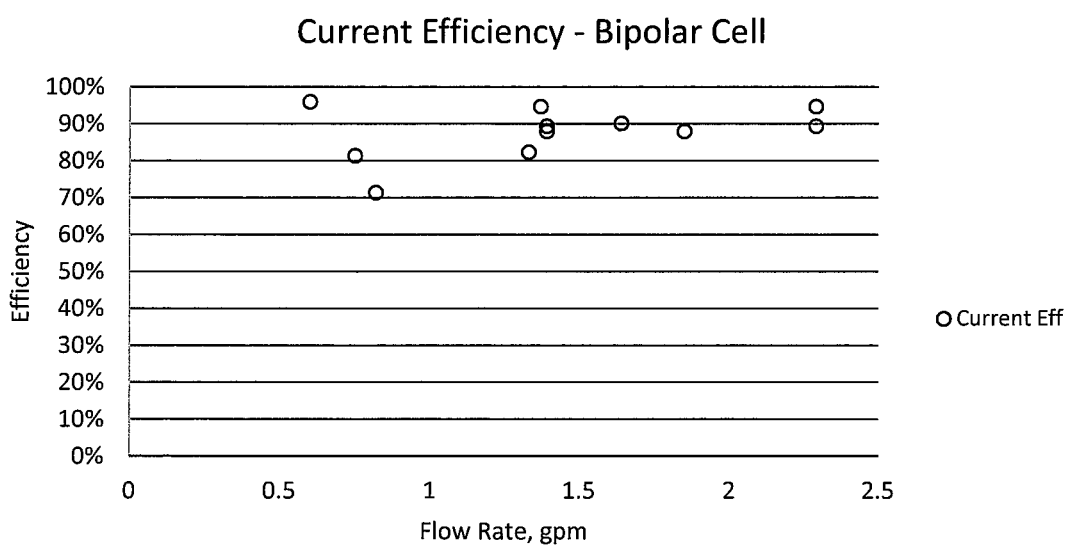
FIG. 8 is a graph demonstrating the current efficiency for the application of the four pair bipolar electrolytic cell as a function of flow rate.

FIG. 8 is a graph demonstrating the current efficiency for the application of the four pair bipolar electrolytic cell as a function of flow rate. The current efficiency is well above 60% for all flow rate conditions tested.

Figure 9:
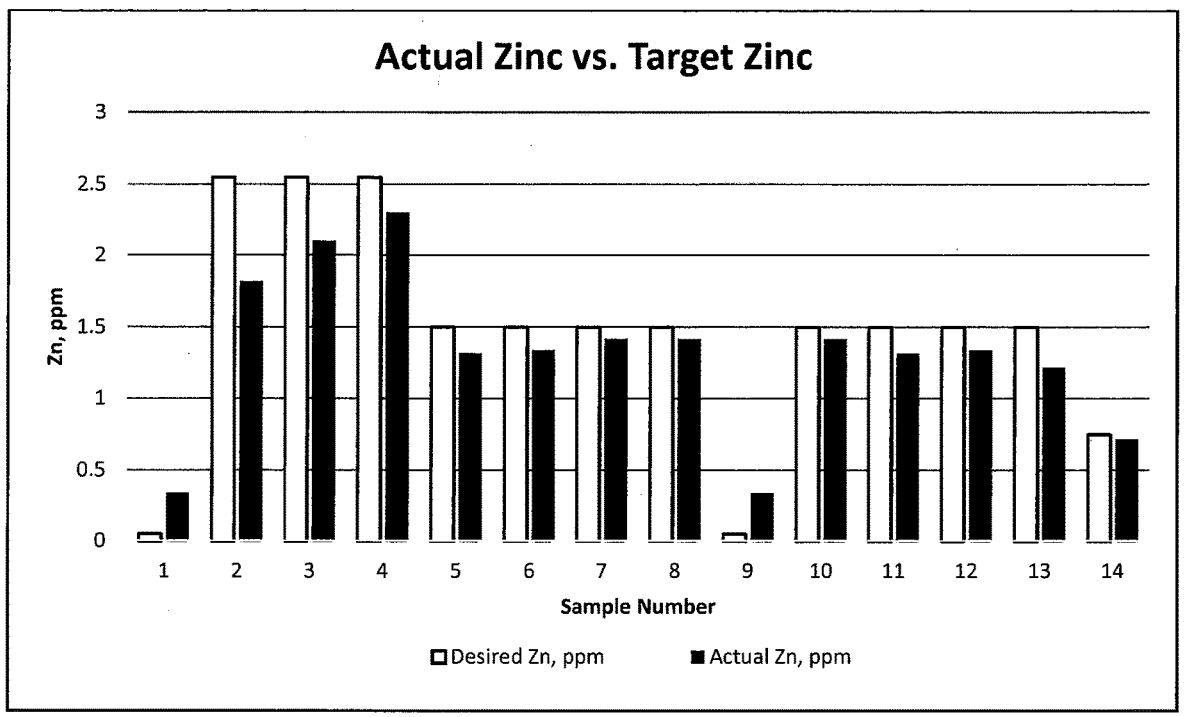
FIG. 9 depicts the amount of zinc (actual zinc) dosed in comparison to the target or desired zinc, in parts per million.

FIG. 9 depicts the amount of zinc (actual zinc) dosed in comparison to the target or desired zinc, in parts per million. As shown, in all cases, the zinc dosing was tightly regulated to within 0.5 to 1 ppm from the theoretically (target) derived value. Consequently, the implementation of a multiple pair bipolar electrolytic cell as a means for delivering or dosing specific quantities of zinc as a scale inhibitor provides for efficient and accurate delivery of zinc into a variable flow of solution.

Figure 10A:
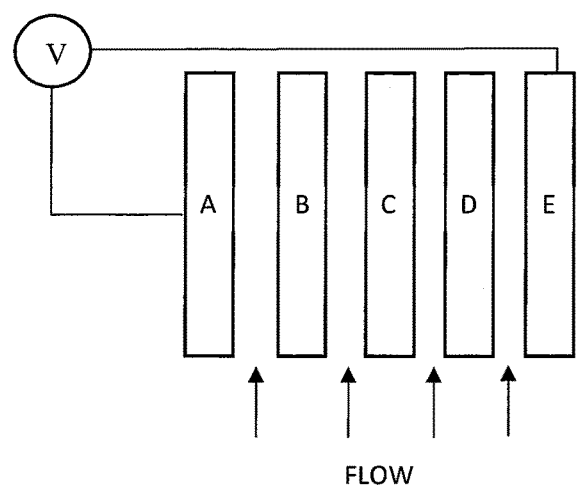
FIG. 10A depicts a parallel plate bipolar design in the unused state where corrosion/depletion is not yet demonstrated.
Figure 10B:
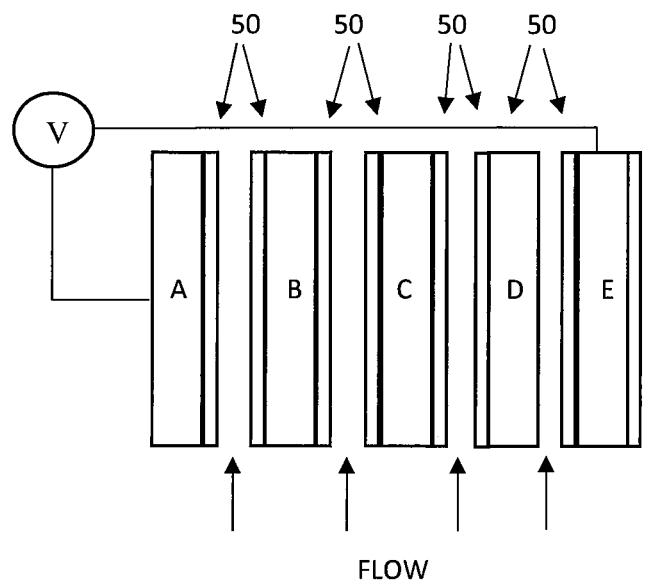
FIG. 10B depicts the parallel plate bipolar electrode design of FIG. 10A at the optimum end-of-life, where each electrode is subjected to uniform corrosion/depletion at its surface face.
Figure 10C:
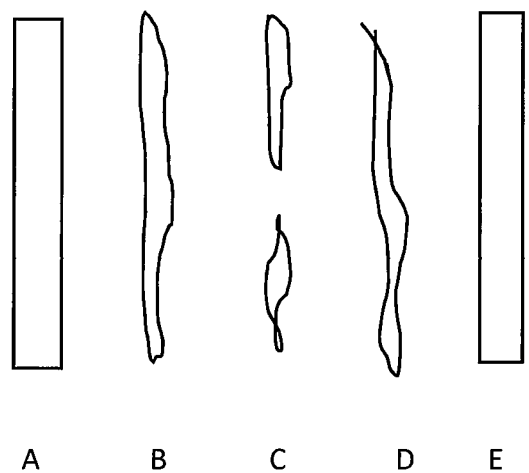
FIG. 10C depicts a delinquent condition of the parallel plate bipolar electrode design of FIG. 10A, where bipolar electrodes have been degraded beyond their uniformity individually and with respect to the other bipolar electrodes.

Different cell configurations have been analyzed. In one embodiment, it was desirable to have the electrode thickness such that about one-half (⅜/15) of the zinc mass is consumed during electrolysis. An advantage of a parallel plate design is that it will assist in keeping corrosion uniform over time. FIGS. 10A-C depict the degradation of the bipolar electrodes (B,C,D) over time. In the unused state (FIG. 10A), the electrodes are each full and uniform, unaffected by the electrolysis process. FIG. 10B depicts a parallel plate bipolar electrode design at the optimum end-of-life, where each electrode is subjected to uniform corrosion/depletion 50 at its surface face as noted by the lighter shaded area on the outer periphery of the plates.

FIG. 10C depicts a delinquent condition, where bipolar electrodes B,C,D are shown to have been degraded beyond their uniformity individually and with respect to the other bipolar electrodes. When the delinquent stage is reached, the bipolar electrolytic cell will no longer perform properly, and may internally short circuit as larger pieces of an individual bipolar electrode break free and possible bridge from one electrode to another.

Based on the desired amount of uniformity of corrosion at the electrolytic cell's end-of-life, it has been determined that a filter change would be warranted when the total current (∫I dt) reaches a set point. As the electrode dimensions change with corrosion/depletion, so does the cell resistance. Thus, the system provides a measurable, quantifiable indicator for cell replacement.

An electrolytic zinc feeder replacement cartridge having a zinc cathode and anode is highly desirable for the attributes discussed above. It allows for reversal of polarity to clean the cathode, conserves space since multiple electrodes may be employed within the solution for supplying consumable zinc to the product water, and simplifies connectivity insomuch as only one set of electrodes is required to be connected to a power supply for use as the driving electrodes.

In order to provide a means to detect and confirm that an electrolytic cell is appropriately designed for polarity reversal, the voltage across the anode and cathode (once in solution) is measured. The control may then confirm that the replaceable cartridge is Zn cathode/Zn anode and suitable for polarity reversal. If the cell anode and cathode are zinc, there will be no galvanic potential. However, if the anode is zinc, and the cathode is another material, such as copper or stainless steel, there will be a measurable galvanic potential difference. This is a desirable attribute because if a cell has dissimilar materials, it has the potential to dose the other material during a polarity reversal. For example, if the cell was copper and zinc respectively, when the polarity is reversed, copper would be introduce into the water.

The electrolytic zinc feeder replacement cartridge would include at least one anode, one cathode, and at least one bipolar electrode. This design allows for a simple two-wire connection, and no orientation is required for connection. A multiple bipolar stack allows for optimization to achieve minimum power in a minimum footprint design.

Using a controller and flow rate meter, it is possible to perform controlled dosing based on a proportional response to concentration and flow. Furthermore, because the current is proportional to the rate of zinc dosing, it can be determined exactly the amount of zinc dosed into solution during the cartridge life, and provide a gauge for the user when the cartridge should be replaced, preferably utilizing the integration of the total current over time: ∫I dt.

Furthermore, because the electrodes will diminish in mass over time, the gap between the electrodes will increase, as will the cell resistance. In time, a change in resistance can also be employed to diagnose when a filter has reached its life expectancy, or possible unduly fouled to the point that replacement is necessary.

Using the preferred electrolytic cell of the present invention, a method for dosing a quantifiable amount of zinc into solution is presented. Applying a voltage potential across an electrolytic cell formed within a housing through the introduction of a DC power source, where the electrolytic cell includes an anode and a cathode electrode, and wherein the anode and cathode electrode are made of zinc or zinc compounds, and exposing the electrolytic cell to an aqueous solution, such that when the voltage potential is applied across the electrodes, zinc is dosed into the aqueous solution at a regulated and quantifiable level. This method may further include introducing a controller for regulating current from the DC power source.

The method may also include introducing an electrolytic cell formed from at least one pair parallel plate electrodes, and/or at least one bipolar electrode. Flow rate information may be provided to the controller via a flow meter, based on a flow rate of the aqueous solution passing between the electrodes, such that the controller regulates said current from said power source as a function of the flow rate to control said zinc dosing to the aqueous solution.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. An electrolytic zinc dosing device comprising:
    a cartridge having an electrolytic cell, said electrolytic cell including an anode and a cathode electrode, both of which are made of zinc or a zinc compound;
    a power source connecting power to said anode and cathode;
    a controller for regulating current from said power source and for detecting and confirming that said electrolytic zinc dosing device is appropriately designed for polarity reversal; and
    a flow meter for providing flow rate information to said controller based on a flow rate of an aqueous solution passing between said electrodes, such that said controller regulates said current from said power source as a function of said flow rate to control zinc dosing to said aqueous solution and influent hardness level;
    wherein said anode and cathode are operable in a forward or reverse polarity, and said polarity is reversible in situ without degradation in performance of said dosing.

2. The electrolytic zinc dosing device of claim 1 wherein said controller adjusts said current such that zinc is dosed in an aqueous solution at a regulated, quantifiable rate on the order of parts-per-million.

3. The cartridge of claim 1 wherein said electrolytic cell is formed from at least one pair of parallel plate electrodes.

4. The cartridge of claim 1 wherein said electrolytic cell is formed from at least one set of concentric cylinders.

5. A cartridge for controlling the precipitation of precipitates from an aqueous solution in an aqueous system, comprising:
    a housing;
    an electrolytic cell formed within said housing, said electrolytic cell including an anode electrode, a cathode electrode, and at least one bipolar electrode in said aqueous solution without metallic connection with the current supply, wherein said anode and cathode electrode each include zinc or zinc compounds exposed to said aqueous solution, such that when current flows through said electrodes, zinc is dosed into said aqueous solution at a regulated and quantifiable level proportional to influent flow rate and influent hardness level;
    wherein said electrolytic cell is operable in a forward or reverse polarity, and said polarity is reversible in situ without degradation in performance of said dosing.

6. The cartridge of claim 5 wherein said anode and cathode are connected to a power source.

7. The cartridge of claim 6 wherein said power source is a DC power source capable of varying the current to said anode and cathode.

8. The cartridge of claim 5 wherein said electrolytic cell is formed from at least one pair parallel plate electrodes.

9. The cartridge of claim 5 wherein said electrolytic cell includes a plurality of bipolar electrodes.

10. The cartridge of claim 5 wherein said bipolar electrode includes zinc or a zinc compound.

11. An electrolytic zinc dosing device comprising:
    a cartridge having an electrolytic cell, said electrolytic cell including an anode electrode, a cathode electrode, and at least one bipolar electrode without metallic connection with the current supply, wherein said anode and cathode electrodes are each made of zinc or zinc compounds exposed to said aqueous solution, such that when power is applied to said electrodes, zinc is dosed into said aqueous solution at a regulated and quantifiable level proportional to influent flow rate and influent hardness level;
    a power source connecting power to said anode and cathode; and
    a controller for regulating current from said power source to adjust said quantifiable level, and to detect and confirm that said electrolytic zinc dosing device is appropriately designed for polarity reversal;

wherein said anode and cathode are operable in a forward or reverse polarity, and said polarity is reversible in situ without degradation in performance of said dosing.

12. The electrolytic zinc dosing device of claim 11 including a flow meter for providing flow rate information to said controller based on said influent flow rate of an aqueous solution passing between said electrodes, such that said controller regulates said current from said power source as a function of said flow rate to control said zinc dosing to said aqueous solution.

13. The electrolytic zinc dosing device of claim 11 including monitoring total current delivered to said electrodes, and determining life expectancy of said electrodes for replacement of said electrolytic zinc dosing device.

14. The electrolytic zinc dosing device of claim 11 wherein said electrolytic cell is formed from at least one pair parallel plate electrodes.

15. The electrolytic zinc dosing device of claim 11 including a plurality of bipolar electrodes situated in parallel in said aqueous solution.

16. The electrolytic zinc dosing device of claim 11 wherein said bipolar electrode is made of zinc or a zinc compound.

\* \* \* \* \*